Figure 1:
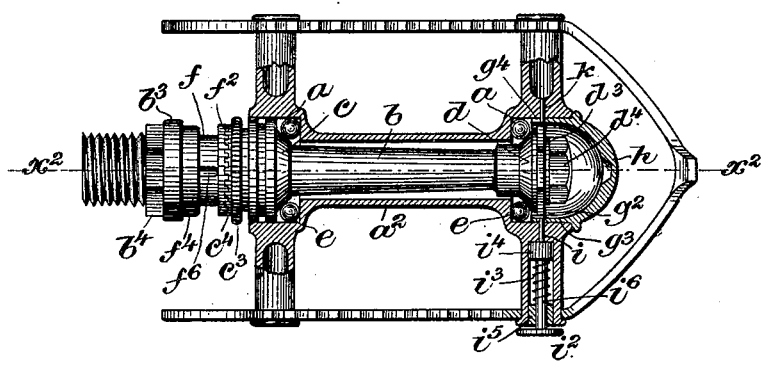

No. 645,574. Patented Mar. 20, 1900.
A. SIDWELL.
ADJUSTABLE BEARING.
(Application filed Aug. 30, 1897.)

(No Model.)

Witnesses
Jas. J. Maloney.
John F. G. Printbrot.

Inventor.
Arthur Sidwell.
by Jos. P. Livermore
Att'y.

UNITED STATES PATENT OFFICE.

ARTHUR SIDWELL, OF WALTHAM, MASSACHUSETTS.

ADJUSTABLE BEARING.

SPECIFICATION forming part of Letters Patent No. 645,574, dated March 20, 1900.

Application filed August 30, 1897. Serial No. 649,965. (No model.)

*To all whom it may concern:*

Be it known that I, ARTHUR SIDWELL, a citizen of the United States, residing in Waltham, county of Middlesex, and State of Massachusetts, have invented an Improvement in Adjustable Bearings, of which the following description, in connection with the accompanying drawings, is a specification, like letters on the drawings representing like parts.

The present invention relates to an adjustable bearing and is embodied mainly in novel means for locking the adjustable bearing member after the proper adjustment has been obtained, the locking device being such that it can be operated without the use of any kind of tools, so that the adjustable member can be instantly unlocked, adjusted, and relocked in its adjusted position. In adjustable bearings as heretofore commonly constructed a lock-nut is in most cases depended upon to hold the adjustable bearing member in position, and it frequently happens that the locking-nut becomes loosened, so that the bearing may tighten up in use, this being especially objectionable in the case of bicycle-pedals, since if toe-clips or other foot-retaining devices are employed and the bearing tightens so that the pedal will not turn the rider's foot may be severely wrenched and injured. Furthermore, after the adjustment is properly effected the tightening of the locking-nut produces a longitudinal movement of the adjustable member, since it is obviously impossible to fit a screw-thread so accurately that there will not be a slight independent movement of the parts, it being therefore difficult to obtain a delicate and accurate adjustment. There have also been bearings in which a locking or retaining device has been held in locking position by a screw or nut, which frequently works loose and in any event requires the use of a tool of some kind when the bearing is to be adjusted.

It is the object of the present invention to obviate these difficulties, and in accordance therewith the adjustable member is provided with a toothed engaging portion coöperating with a spring-actuated locking device secured to the part on which the adjustable bearing member is threaded in such a way that there can be no independent rotary movement of the said part with relation to the locking device, or vice versa, the said locking device, however, being movable to and from the adjustable member, so as to lock or unlock the same. While it is obvious that this locking device can be applied to an adjustable bearing of any suitable or usual type and for any usual purpose, it is herein shown as applied to a bicycle-pedal in which the female bearing members are formed in the hub of the pedal and the male bearing members or cones on the spindle thereof, one of the male members being the adjusting member, it being obvious that in many instances these parts may be reversed—as, for example, in the so-called "Humber" type of crank-hanger bearings for bicycles. As herein shown, the adjustment is effected by the movement of one of the cones toward the other, the said cone being threaded upon the spindle, (the other cone being fixed with relation thereto,) and the locking device is connected with the spindle so as to be incapable of rotation with relation thereto, but free to move along the same toward or from the adjusting-cone, with which it engages. As herein shown, the bearing is provided with a dust-cap having novel means for securing the same to the part which contains the female bearing members, this dust-cap being in use where the spindle is not supported at its outer end—as, for example, in bicycle-pedals and carriage-wheels, where the spindle is not connected with a fork, as is the case with bicycle-wheels.

Figure 3:
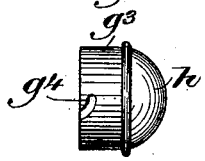
Figure 2:
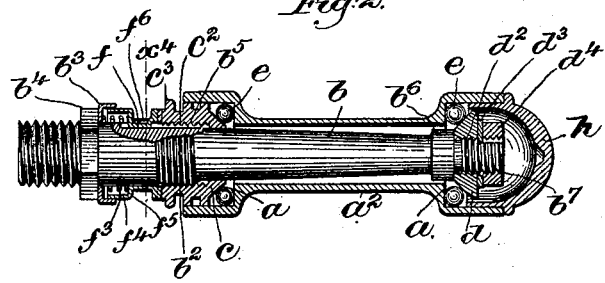
Figure 4:
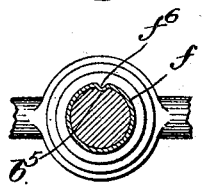

Figure 1 is a horizontal section of a bicycle-pedal provided with a bearing embodying the invention. Fig. 2 is a similar horizontal section on line $x^2$ of Fig. 1 in a plane perpendicular to that of Fig. 1. Fig. 3 is a detail showing the dust-cap in side elevation, and Fig. 4 is a transverse section on line $x^4$ of Fig. 2.

The female members $a$ of the bearing are herein shown as formed in the hub portion $a^2$ or rotary part of a bicycle-pedal. The male members $c$ and $d$ are shown in conjunction with the spindle $b$ and consist of the cones between which and the bearing members $a$ are interposed the antifriction-balls $e$. In accordance with the present invention the adjusting-cone $c$ is provided with an internal screw-thread $c^2$, coöperating with a thread $b^2$ upon the spindle, the said cone being further provided with an actuating portion $c^3$, herein shown as an annular knurled surface adapted to be operated by the fingers, it being practicable, of course, if desired, to face said portion so that it will coöperate with a wrench or spanner. In conjunction with the adjusting member $c$ the bearing is provided with a locking device coöperating with said cone to prevent the same from turning upon the spindle after the proper adjustment has been obtained. The said locking device consists of a movable member $f$, herein shown as a slidable sleeve surrounding the spindle $b$, the said member being adapted to interlock with said adjusting member and being herein shown as provided with teeth or other engaging portions $f^2$, adapted to coöperate with corresponding recesses, which are shown as afforded by forming similar teeth or engaging portions $c^4$ upon the cone $c$. The said locking device $f$ is normally held in locking position by means of a spring $f^3$, the said spring being interposed between said member and a fixed part of the spindle and herein shown as inclosed by a cylindrical shell $f^4$, which forms part of the member $f$ and a similar shell $b^3$, mounted on the spindle $b$ and resting against a shoulder $b^4$, with which the spindle is provided. In a bicycle-pedal the said shoulder may be the faced enlargement which takes the wrench and bears against the side of the crank when the pedal is screwed into place. The cylindrical shell $f^4$ is shown as somewhat larger than the main body of the sliding locking device $f$, whereby an annular shoulder $f^5$ is afforded, against which the spring $f^3$ bears, the shell $f^4$ fitting into the mouth of the shell $b^3$, so that the spring is completely inclosed. To admit of the longitudinal movement of the sliding member and at the same time to prevent the same from having any rotary movement on the spindle, the said member is shown as provided with a projection $f^6$, coöperating with a groove $b^5$, extending longitudinally along the surface of the spindle $b$, the said groove and projection thus practically constituting a spline connection, as indicated in Fig. 4. To adjust the bearing, it is necessary merely to press back the sliding locking device $f$ with the fingers until the teeth $f^2$ are withdrawn from engagement with the teeth $c^4$, so that the cone $d$ is free to turn, the said cone then being turned with the fingers until the proper adjustment is reached, after which it is instantly locked by releasing the sliding locking device $f$. The adjusting-cone in this way is positively locked without depending upon a locking-nut, as in the old manner of adjustment, and the adjustment can be easily effected without the use of tools.

A further feature of the present invention consists in the method of securing the dust-cap $h$ to the outer end of the female part of the bearing, the said dust-cap being held in place by a locking device $i$, consisting of a longitudinally-movable pin extending transversely toward the seat of the dust-cap and adapted to enter a hole $g^2$ in the cylindrical shell $g^3$ of the dust-cap when the cap is in place, as shown in Fig. 1. To coöperate with the fastening-pin $i$, the seat for the dust-cap is also provided with a fixed pin $k$, which is adapted to enter a slot $g^4$, said slot beginning at the edge of the shell $g^3$ and turning laterally, as shown in Fig. 3. The said slot $g^4$, in conjunction with the fixed pin $k$, constitutes a bayonet-joint, so that when the dust-cap is to be applied the sliding pin $i$ is withdrawn by means of an actuating-knob or finger-piece $i^2$ and the dust-cap inserted, so that the pin $k$ will enter the end of the slot $g^4$, the pin $i$ then being released and the dust-cap turned until the said pin $i$ snaps into place through the action of a spring $i^3$ with which it is provided. The said spring is shown as interposed between the shoulder $i^4$ and a plug $i^5$, through which the stem $i^6$, which carries the pin $i$, extends, the said plug being secured in any suitable way. By this construction the dust-cap is easily removed and at the same time cannot work loose, owing to the vibration attendant upon the use of the bearing, as is the case with a dust-cap which is screwed into position, and the appearance of the bearing is improved, since the dust-cap may be made perfectly plain instead of grooved at the end to take a screw-driver. Furthermore, after a dust-cap of the old kind has been removed once or twice by means of a screw-driver it is nearly always jammed and marred, so as to have a battered appearance. With the dust-cap arranged in accordance with the present invention, so that it is easily removable, no opening need be afforded in the hub for oiling the bearing, since the dust-cap may be easily removed and the bearing oiled from the end. The cone $d$ in certain types of bearing—for example, in the bearing commonly used with bicycle-wheels—may be formed integral with the spindle or otherwise fixed thereon, in any event being permanently stationary with relation to the spindle. In the case of a bicycle-pedal, such as is shown, or carriage-axle where the bearing would be of substantially the same type, the parts have to be assembled from the outer end, so that the cone $d$ has to be applied after the other parts are in place. As herein shown, therefore, the spindle $b$ is provided with a shoulder $b^6$ and a threaded stem $b^7$ beyond the said shoulder to coöperate with an internal screw-thread $d^2$ in the cone $d$. When, therefore, the locking device and the adjustable cone have been placed in position and the hub applied thereto, the said cone $d$ is screwed up against the shoulder $b^6$ tight and then securely fixed, as by means of a washer $d^3$ and locking-nut $d^4$. It is therefore practically impossible for this cone to leave its final position, and the adjustable cone, in accordance with the invention, is positively locked, so that it is impossible for the bearing to tighten up when in use.

It is not intended to limit the invention to the specific construction herein shown and described, since modifications may obviously be made without departing from the invention.

I claim—

1. In a bearing, the combination with the male and female bearing members, one of said members being adjustable with relation to the other and provided with one or more engaging portions; a support for said adjustable member; a locking device non-rotatably mounted on said support but movable with relation to said adjustable member; an annular shoulder on said locking device surrounded by a flange; a corresponding flange on said support, said flange fitting the flange of the locking device; and a spring inclosed by said flanges to hold said locking device in engagement with said adjustable member, substantially as described.

2. The combination with a female bearing member, of a dust-cap having a cylindrical shell to fit said member, a laterally-turned slot extending inward from the edge of said shell, a fixed projection from the bearing member to coöperate with said slot after the manner of a bayonet-joint, an opening in said shell, and a pin longitudinally movable with relation to the bearing member and arranged to enter said opening after the fixed pin has entered the groove, substantially as described.

In testimony whereof I have signed my name to this specification in the presence of two subscribing witnesses.

ARTHUR SIDWELL.

Witnesses:
H. J. LIVERMORE,
MARY E. MARONEY.